United States Patent Office 3,556,566
Patented Jan. 19, 1971

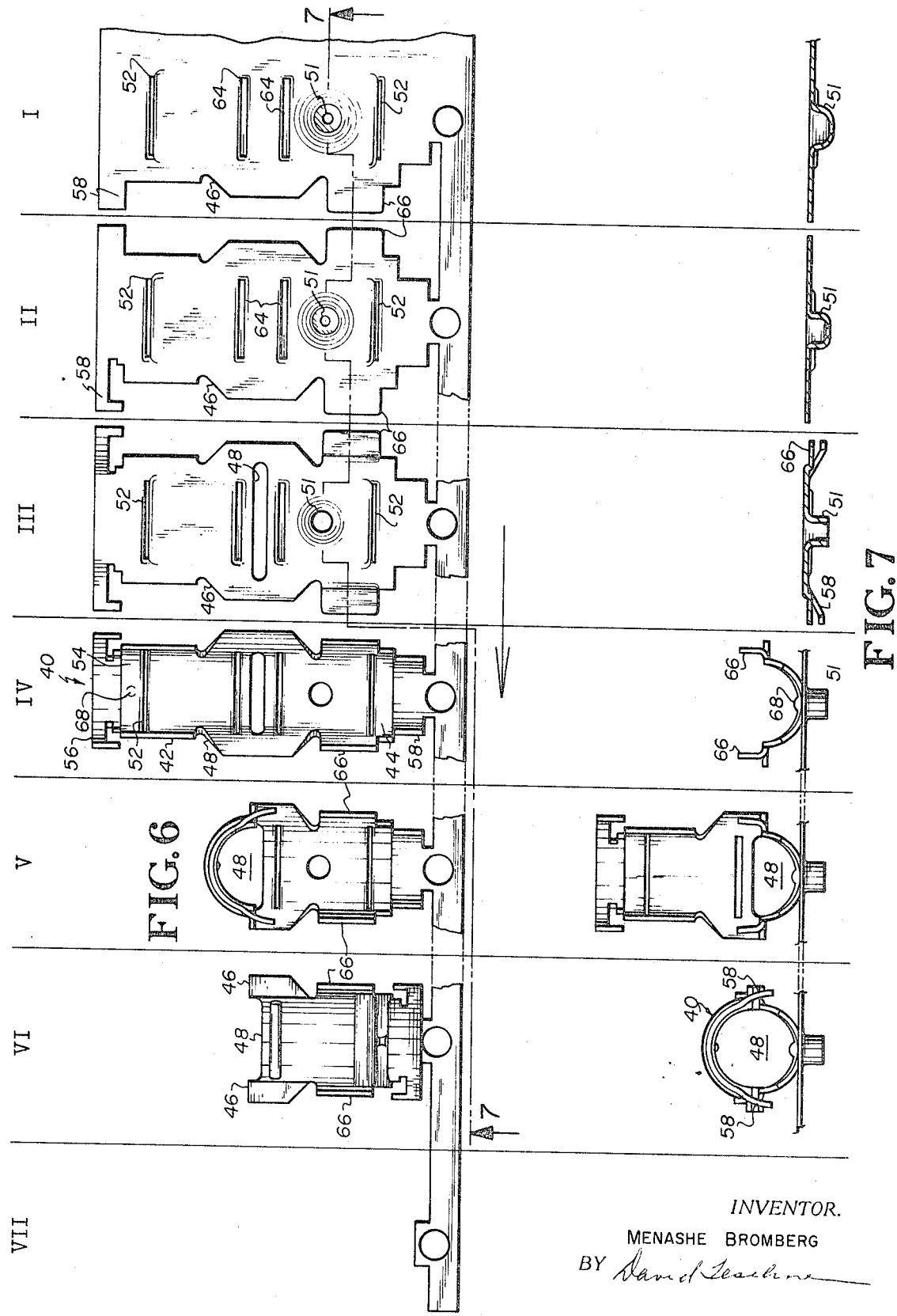

3,556,566
COUPLING
Menashe Bromberg, West Orange, N.J., assignor to The Thomas & Betts Co., Elizabeth, N.J., a corporation of New Jersey
Filed Jan. 15, 1968, Ser. No. 697,835
Int. Cl. F16l 5/00
U.S. Cl. 285—162                           10 Claims

ABSTRACT OF THE DISCLOSURE

The invention is directed to a coupling and more particularly to a coupling for joining a conduit to an electrical fixture box. The coupling is an expansion type setscrew operated coupling for coupling a conduit to an electrical box having an insulated out-throat for the coupling. The coupling consists of three major components; a steel body, a steel setscrew and a plastic throat. The body is a split tubular device comprised of two halves connected by two hinged ears approximately centrally located at one end of the coupling. The upper half of the split body has an extruded, threaded boss which houses a setscrew, a retaining groove having two shoulders and a skirt. The retaining groove facilitates the securing of the assembled coupling in an electrical fixture box knockout. It also contains a dimple, which, together with one of the shoulders of the retaining groove, acts as a limiting stop for the insertion of a conduit into the coupling. The skirts are used to prevent concrete, or other foreign matter, from getting into the assembled coupling and/or into the electrical fixture box itself. The lower half of the body consists of a section to support the conduit, a retaining groove to secure the coupling in a knockout and a section which supports the plastic throat. The setscrew, which is tightened against the conduit and which causes the locking of the coupling into a knockout in the box, is permitted to dig into the conduit to secure the conduit to the coupling itself. Finally, a plastic throat, having complementary ears formed thereon, is inserted into the out-throat of the coupling and secured thereto by means of retaining ears of the coupling body. The plastic throat provides a smooth entry into the coupling and to the conduit from the electrical fixture box to prevent destruction or abrasion of the insulation of conductors to be placed within the conduit.

BACKGROUND OF THE INVENTION

Field of the invention

The invention is directed to the field of coupling conduit sections to electrical fixture boxes. It may equally be applied to the coupling of tubes, or rods or similar devices to other supporting members. In the usual configuration, it is desired to connect one or more electrical fixture boxes together by means of an electrical conduit in which conductors are placed. In order to connect the conduit to the boxes at its terminal ends, it is necessary to use some sort of coupling which will be jointly secured to the conduit and to the electrical fixture box.

Description of the prior art

As is shown in FIG. 1, to be described in detail below, prior art couplings for coupling conduits to electrical fixture boxes consisted of one piece, formed, cylindrical blanks having metallic throats at the out-throat, that is the entrance aperture into the electrical fixture box, and at the in-throat where the conduit enters. In a typical device, as is shown in the figure, an in-throat aperture of a desired cross section is formed into the blank of the coupling, which is then folded along two hinge lines, one at the top and one at the bottom of the conduit in-throat. This manner of forming the in-throat is extremely wasteful of material since the slug removed for the aperture is waste. The out-throat between the coupling and the electrical fixture box is formed by blanking a circular hole into a further portion of the blank and folding it into position along a single hinge. Because of the two hinges at the in-throat the tightening of the fastening means against a conduit placed therein permitted relative motion between the top and bottom members of the coupling in such a manner that the upper and bottom portions could be moving along the conduit in opposite directions. Further the metal out-throat formed at the same time as the coupling itself and being all metal had to be specially treated to prevent the appearance of burrs, ragged edges or the like which could cause the deterioration or the destruction of the insulators of conductors placed within the coupling. Also, since the metallic out-throat is coupled to the bottom member of the coupling any shifting of the top and bottom members with respect to one another due to the tightening of the setscrew will shift the position of the out-throat and may cause further destruction to the connectors placed within the coupling.

SUMMARY OF THE INVENTION

The coupling of the invention obviates all the foregoing disadvantages found in the representative prior art device. The coupling is fabricated in the flat providing necessary stop members and throat retaining ears, hinges and a setscrew receiving aperture. The coupling is then formed into a U-shaped about its longitudinal axis and then folded over along a transverse slot to form the in-throat. Due to the forming of the in-throat by means of the enlargement of a single transverse slot a single pair of ears, formed along a transverse axis to the coupling is created. No waste of material is caused because the in-throat is not blanked from the flat material stock. The transverse ears provide that the upper and lower sections of the coupling may only move relative to one another in a transverse direction to the conduit when the setscrew is tightened against the conduit placed therein. The motion of the hinges does not permit the upper and lower sections to move with respect to one another along the length of the conduit.

Additionally, no metal out-throat is required in this type of device. Instead, a pair of ears are provided at the out-throat area and a separate plastic throat having complementary retaining ears is placed at the out-throat. The complementary ears on the throat and the retaining ears on the coupling are assembled so that the throat may be retained by the coupling so as to provide a smooth insulation protecting throat at the out-throat region of the coupling. Further, skirts are provided from the upper member of the coupling over the seam between the split halves of the coupling whereby cement and other foreign material may be kept from within the coupling and from within the box itself. Various retaining rings and ridges are provided for proper seating of the coupling within the knockout of an electrical fixture box and to limit the extent to which the conduit may be placed within the coupling.

Further, since the coupling is dimensioned to permit the conduit to be brought virtually to the outside wall of the electrical fixture box no special preparation need be made for decreases in length of the conduit as a result of the use of the coupling. In prior art devices of the type noted, above allowances must be made for the length of the coupling. However, in the instant invention the conduit is permitted to extend all the way into the coupling to a point substantially equivalent to the outer wall of the electrical fixture box; thus eliminating the necessity for allowance on the cutting of the conduit. The action of the setscrew, tightened against the conduit placed within the connector, has the complementary effects of first seizing the connector to the conduit and secondly expanding it sufficiently to cause the retaining ring of the connector to seize the walls about the knockout of the electrical fixture box. It is therefore an object of this invention to provide an improved form of setscrew operated expansion type conduit coupling.

It is another object of this invention to provide an improved form of coupling for coupling a conduit to an electrical fixture box whereby the action of the setscrew of the coupling causes the coupling between the connector and the conduit and the connector and the electrical terminal box.

It is still another object of this invention to provide an improved form of coupling having but a single hinge line of action which prevents the halves of a split coupling from moving in directions along the conduit.

It is another object of this invention to provide an improved form of coupling having an in-throat thereof formed by the expansion of a transverse slot.

Other objects and features of the invention will be pointed out in the following description and claims and illustrated in the accompanying drawings, which disclose, by way of example, the principle of the invention, and the best modes which have been contemplated for carrying it out.

BRIEF DESCRIPTION OF THE DRAWINGS

In the figures:

FIGS. 6 and 7 illustrate the various steps in the manufacture of the coupling of FIG. 2.

Similar elements are given similar reference characters in each of these respective figures.

DESCRIPTION OF THE PREFERRED EMBODIMENT

Figure 1:
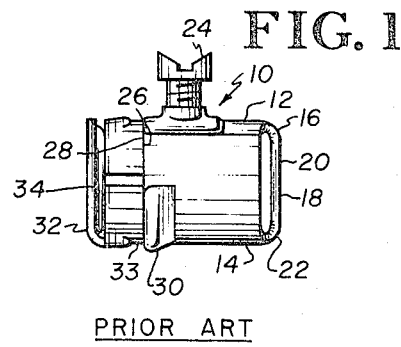
FIG. 1 is a side elevation of a coupling found in the prior art.

Referring now to FIG. 1 there is shown a coupling 10 constructed in accordance with the concepts commonly found in the prior art. The coupling 10 is of the split type having a top member 12 and a bottom member 14. The top member 12 and bottom member 14 are coupled to one another by means of the back member 16 in which an aperture 18, nonvisible in the figure is provided as the in-throat for the conduit to be inserted within the coupling 10. Back member 16 is coupled to top member 12 and bottom member 14 respectively by the hinges 20 and 22. The hinges 20 and 22 extend across the width of the in-throat and thus provide two hinge points or lines of movement for the top and bottom members 12 and 14 respectively. A conduit (not shown), inserted within the coupling 10, is coupled to the coupling by means of a fastener 24. Thus, as the fastener 24 is tightened upon the conduit the top and bottom members 12 and 14 respectively are permitted to move apart; that is, with respect to one another but may also be caused to move longitudinally along the length of the conduit. To prevent the coupling from shifting longitudinally along the conduit bottom member 14 has a built up shoulder 26 to act as a stop for the outwardly turned shoulders 28 of the top member 12. Shoulder 28 will move against the shoulder 26 of the bottom member 14 or vice versa depending upon which direction the split portions of the coupling tend to move. A stop rib 30 is provided to limit the forward insertion of the coupling 10 into the knockout of an electrical fixture box (not shown). Retaining ring 32 is employed to seize the wall about the knockout as the fastener 24 is tightened. At the out-throat area, or the area which is inserted within the knockout of the electrical fixture box, there is placed a throat 32 which is formed as a portion of the bottom member 14 and is folded up to form the throat. Throat 32 has a bushing 34 which is made smooth to prevent the abrasion of the insulation of conductors placed within the coupling and the conduit. Great care must be taken during the manufacture of the coupling of the prior art in order to insure that the throat 32 and the bushing 34 will be absolutely smooth on their edges to prevent the abrasion of the insulation of conductors placed therein and the shorting which could occur. Further, the movement of the top and bottom members 12 and 14, respectively, tend at times to reposition the throat 32 with unwanted hinderance of the conductors and other elements within the electrical fixture box.

Figure 2:
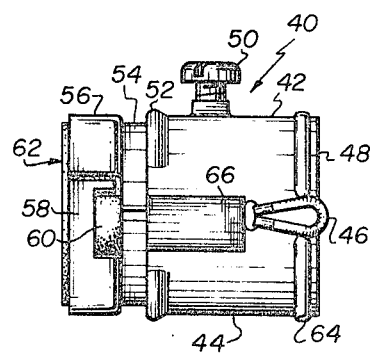
FIG. 2 is a side elevation of a coupling constructed in accordance with the concepts of the invention.

Turning now to FIG. 2 there is shown a coupling 40 constructed in accordance with the concepts of the invention. The coupling 40 is a split member having a top member 42 and a bottom member 44. The top member 42 and bottom member are joined to one another by means of the single hinge 46. The manner in which the opening 48 (not shown) provides the in-throat of the coupling 40 is considered below. It is not necessary to provide a back member of any type and the waste of blanking out the in-throat is eliminated. Further, the single hinge 46 provides a single line of action and the only way in which the top member 42 and bottom member 44 are permitted to move is away from one another in a direction transverse to a conduit inserted within the coupling 40. The coupling between the coupling 40 and a conduit inserted within the in-throat 48 is by means of the fastener 50, which when screwed down upon the conduit, will cause seizure of the conduit, in a manner to be described with reference to FIG. 5, and will also cause the expansion of the top member 42 and bottom member 44 to seize the wall about the knockout in the electrical fixture box. At the out-throat area of the coupling 40 there is found a stop member 52 to limit the insertion of the coupling 40 into the knockout of an electrical fixture box. Further, there is a retaining groove 54 which is used to seize the walls about the knockout of the electrical fixture box. Finally, there is a shoulder 56 which will be used to accept and house a portion of the plastic throat to be inserted therein. Coupled to the bottom member 44 is a pair of retaining ears 58 which will seize complementary ears 60 of a plastic throat 62 inserted in the out-throat. This will be described below with reference to FIG. 6. Once the throat 62 has been positioned within the retaining shoulder 56 the retaining ears 58 will be closed inwardly thereby to capture the complementary ears 60 of the throat 62. Reinforcing ring 64 is positioned about the in-throat area close to the point of entry of the conduit within the coupling 40. Skirts 66, only one of which is visible in FIG. 1, are coupled to the upper member 42 to provide coverage over the split region between the upper member 42 and lower member 44 to prevent the entrance of foreign matter into the coupling and the resultant entry into the electrical fixture box. Although coupling 40 has been shown as circular, in cross section, it should be understood that it may take any convenient cross-sectional shape such as square, rectangular, oval, hexagonal or any other regular or irregular geometrical shape.

Figure 3:
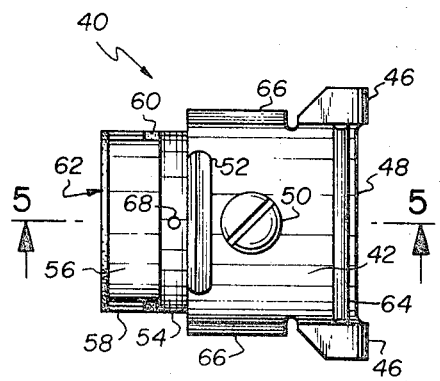
FIG. 3 is a plane view of the coupling of FIG. 1.

Referring now to FIG. 3 there is shown a top view of the coupling 40 of FIG. 2. From this figure the details of the hinges 46 are better seen. The hinges 46 extend outwardly from the main body of the coupling 40. As described above, the hinge 46 will provide only for the separation of the top member 42 and bottom member 44 in a direction transverse to a conduit inserted within the in-throat 48 of the coupling 40. Additionally, there is shown a dimple 68 which as will be shown in FIG. 5 provides additional stop means for the insertion of a conduit within the coupling 40.

Figure 4:
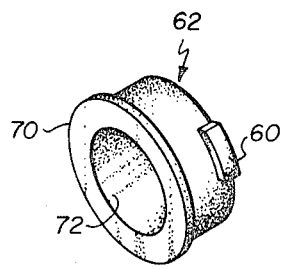
FIG. 4 is a detailed showing of the plastic throat of the connector of FIG. 2.

In FIG. 4 there is shown more detail of the plastic throat 62 which will be placed in the out-throat area of the coupling 40. The plastic throat 62 is of a generally circular shape and has a lip 70 which will limit the insertion of the plastic throat 62 into the coupling 40. Additionally, the lip 70 is of sufficient width to protect the side edges of the shoulder 56 and prevent their contact with conductors placed within the coupling 40 to prevent the abrasion of the insulation thereupon. Complementary ears 60 will be engaged in a manner which has been described above by the retaining ears 58 of the bottom member 44 of the coupling 40. The aperture 72 provided through the length of the plastic throat 62 permits the insertion of conductors from the electrical fixture box through to the conduit. The edges leading into the aperture 72 are made smooth to prevent abrasion of the insulation of conductors placed therethrough.

Figure 5:
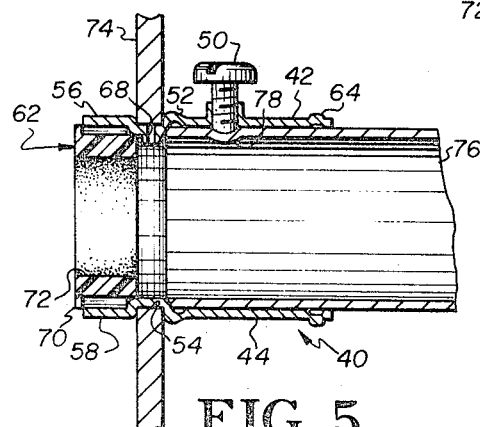
FIG. 5 is a side elevation of the coupling of FIG. 3 taken along the lines 5—5 and showing it installed within the aperture in a wall of an electrical fixture box.

Turning now to FIG. 5, as illustrated in sectional view taken along the line 5—5 of FIG. 3, coupling 40 is inserted into the aperture, or knockout, of an electrical fixture box wall 74 and has a conduit 76 inserted within the coupling 40. As is shown in FIG. 5 the fastening means 50 has been tightened against the conduit 76 causing the deformation 78 by which the conduit will be retained within the coupling 40. As can be seen from FIG. 5, stop member 52 acting in concert with the stop member or dimple 68, has been employed to limit the insertion of the conduit 76 into the coupling 40. Because of the positioning of the stop members 52 and 68 the conduit has been permitted to go through the largest portion of the coupling 40 and is brought to a position at the outer surface of the wall 74 of the electrical fixture box. The wall 74 of the electrical fixture box is positioned within the retaining groove 54 and is against the stop member 52. Stop member 52 having acted on the outside surface thereof as a stop member to limit the insertion of the coupling 40 within the electrical fixture box. Further, the tightening of the fastener 50 against the conduit 76 has caused the movement of the top member 42 and bottom member 44 away from one another to assure seating of the retaining ring 54 against the walls about the knockout of the electrical fixture box. Thus, the electrical fixture box wall 74 wil be seized and the necessary coupling between the coupling device 40 and the electrical fixture box is achieved.

Although a stop means 52 has been shown to extend about the major portion of the periphery of the coupling 40 it should be understood that a stop means 52 may be made around half of the periphery of the coupling 40 or any other desirable amount. Further, although a single dimple or stop means 68 is used, as many as desired may be employed within the retaining groove 54. Also, a pair of complementary ears 60 has been shown to cooperate with the retaining ears 58 of the coupling 40. Again, as many retaining ears 58 and as many complementary ears 60 as are desired may be employed.

Turning now to FIGS. 6 and 7, the manner of fabrication of the coupling 40 may be appreciated. FIG. 6 is a plan view of the various stages of manufacture of the coupling 40 as it is operated upon from original material stock to the final product. FIG. 7 taken along the line 7—7 of FIG. 6 is a front elevation of the blank processing shown in FIG. 6. In step I the blank of material which has been fed in from the right side of the figure (not shown) is placed in a first position of a press, or similar device, the retaining ears 58 are partially stamped out and the raised ridges 64, at the in-throat end of the coupling 40, as well as the stops 52, are formed into the material. Further, a built up shoulder 51 is created with an aperture therein to receive the fastening means 50. Further, the basic outline of the coupling body as well as the skirts 66 are formed. All of these operations are done in the flat, that is with the coupling 40 laid out flat along the width of the entire sheet. In step II there is shown the completion of the forming of the left retaining ear 58 and the further coining of the ribs 52, 64 and the aperture 51. In step III the ears 58 on both sides of the coupling 40 are completely formed and the complete shape of the coupling 40 is now visible. In addition, the slot which will become the opening 48 of the in-throat has been formed. The retaining ears 58, as is more clearly shown in FIG. 7, have now been folded downwardly and outwardly in the position they will occupy in the finished coupling prior to the insertion of the plastic in-throat 62. At this point all the operations in the flat have been completed and the next operations upon the coupling will be in the forming of the halves of the coupling 40 into a semi-circular form. As may be seen from FIG. 7 at step IV, the entire blank has been formed into a semi-circular form and with the skirts 66 extending outwardly from the general contour of the body portion of the coupling 40. The ears 58 are now extended parallel with and offset with respect to the main portion of the body. The dimple 68 has been placed within the retaining groove 54, as is shown in FIGS. 6 and 7. At this point, as is shown in step V, the bottom member 44 of the coupling 40 is folded along a center line extending through the aperture 48 in order to form the fully circular coupling 40. Step number VI shows the entire coupling 40 in its substantially completed step as far as metal forming is concerned. Aperture 48, constituting the out-throat has been completely formed by means of the extension of the slot originally formed in step number III. The area of material to the left and right of the slot have now become the ear portions 46 and as shown the retaining ears 58 extend outwardly from the main body form of the coupling 40 in order to be in a position to accept the plastic throat 62. Once the throat 62 has been positioned against the shoulder 56, as is better shown in FIG. 5, the retaining ears 58 will be bent inwardly assuming a contour substantially the same as the remaining portion of the body of the coupling 40. Finally, in step number VII, the coupling 40 has been completely severed from the remaining portion of original stock blank. This view is not shown in FIG. 7 although the steps shown are directed for manufacture by means of a press with a plural station die arrangement, any other convenient method of manufacture may be employed such as by providing individual presses with individual die arrangements for each step, by partially machine and partially hand manufacture or any combination. Construction of the outer throat, in this manner, that is by use of a single slot which will provide a weakened area for a fold point and which results in the production of a set of hinges along a single line of action, provides as described above, a coupling which when tightened against a conduit placed therein, will not separate in a manner described above with reference to prior art devices. The hinges formed will instead provide only for the desired expansion of the coupling 40 to grasp the walls of the electrical fixture box as is desired on this type of device. Further, because of the manner of forming of the in-throat 48 the usual difficulties encountered with manufacture of this type of device are avoided. In the manufacture of the prior art device, such as that shown in FIG. 1 above, it is necessary that the in-throat 18 be fabricated in the flat and that great care be exerted to prevent this throat from being deformed when the upper and lower portions of the coupling are folded over to form the complete connector. The improper formation of the fold points, or hinges 20 and 22 of the prior art device, will constrict or otherwise deform the in-throat 18 preventing its operaton as desired.

While there have been shown and described and pointed out the fundamental novel features of the invention as applied to the preferred embodiment it will be understood that various omissions and substitutions and changes of the form and details of the device illustrated and in its operation may be made by those skilled in the art, without departing from the spirit of the invention.

The embodiments of the invention in which an exclusive property or privilege is claimed are defined as follows:

1. A device for coupling a conduit to an electrical fixture box comprising: an arcuate top member, generally conforming to the shape of a conduit; an arcuate bottom member, generally conforming to the shape of a conduit; said top and bottom members spaced apart a distance sufficient to permit the insertion of a conduit therebetween; hinge means disposed in diametrically opposing relation generally intermediate said top and bottom members and in normal, planar relation to the transverse axis thereof; said hinge means coupling said top and bottom members together at a first end thereof; ear means at the second end of one of said top or bottom members; throat means, having a smooth entry aperture therein, positioned adjacent the second ends of said top and bottom members, said throat means being positioned and retained in its established position by said ear means; and fastening means in one of said top or bottom members, disposed in a plane generally normal to the plane of said hinge means to couple said device to a conduit inserted therein.

2. A device for coupling a conduit to an electrical fixture box comprising: an arcuate top member, generally conforming to the shape of a conduit; an arcuate bottom member, generally conforming to the shape of a conduit; said top and bottom members spaced apart a distance sufficient to permit the insertion of a conduit therebetween; hinge means coupling said top and bottom members together at a first end thereof; ear means at the second end of one of said top or bottom members; throat means, having a smooth entry aperture therein, positioned adjacent the second ends of said top and bottom members; said throat means having complementary ears to engage with said ear means to prevent the unwanted removal of said throat means; and fastening means in one of said top or bottom members to couple said device to a conduit inserted therein.

3. A device as defined in claim 1, wherein one of said top or bottom members has stop means spaced from said second end thereof to limit the insertion of a conduit into said device.

4. A device as defined in claim 1, wherein both of said top and bottom members has stop means spaced from said second ends thereof to limit the insertion of a conduit into said device.

5. A device as defined in claim 4, wherein said top member has an additional stop means spaced from said second end to limit the insertion of a conduit into said device.

6. A device as defined in claim 1, further including stop means spaced from the second ends of said device to limit the insertion of said device into an aperture in an electrical fixture box.

7. A device as defined in claim 1, further including a retaining groove extending along the outside periphery of both said top and bottom members and spaced from the second ends thereof, said retaining groove adapted to engage the wall of an electrical fixture box and retain said device therein.

8. A device as defined in claim 1, further including skirt means coupled to said top member and extending along the outer surface of said bottom member, whereby any space between said top and bottom members is substantially covered to prevent the entrance of foreign matter into said device.

9. A device as defined in claim 1, wherein said fastening means is a setscrew, said setscrew when tightened against a conduit inserted within said device causes said top and bottom members to move apart causing the seizing of the wall of an electrical fixture box about an aperture in which said device is placed.

10. A device for coupling a conduit to an electrical fixture box comprising: an arcuate top member, generally conforming to the shape of a conduit; an arcuate bottom member, generally conforming to the shape of a conduit; said top and bottom members spaced apart a distance sufficient to permit the insertion of a conduit therebetween; hinge means disposed in diametrically opposing relation generally intermediate said top and bottom members and in normal, planar relation to the transverse axis thereof; said hinge means coupling said top and bottom members together at a first end thereof; throat means having a passage therethrough coupled to one of said top or bottom members at the second end thereof and positioned adjacent the second ends of said top and bottom members; and fastening means in one of said top or bottom members, disposed in a plane generally normal to the plane of said hinge means to couple said device to a conduit inserted therein.

References Cited

UNITED STATES PATENTS

| Re. 15,891 | 8/1924 | Thomas, Jr. | 285—218 |
| 3,174,776 | 3/1965 | Berger | 285—162 |
| 3,183,297 | 5/1965 | Curtiss | 285—162 |

FOREIGN PATENTS

| 495,130 | 8/1953 | Canada | 285—162 |

DAVID J. WILLIAMOWSKI, Primary Examiner

W. L. SHEDD, Assistant Examiner